United States Patent
Suzuki

(10) Patent No.: US 9,179,087 B2
(45) Date of Patent: Nov. 3, 2015

(54) AV DEVICE

(75) Inventor: Takayuki Suzuki, Suzuka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 2034 days.

(21) Appl. No.: 12/306,623

(22) PCT Filed: Jul. 23, 2007

(86) PCT No.: PCT/JP2007/064410
§ 371 (c)(1),
(2), (4) Date: Dec. 24, 2008

(87) PCT Pub. No.: WO2008/013131
PCT Pub. Date: Jan. 31, 2008

(65) Prior Publication Data
US 2009/0256967 A1    Oct. 15, 2009

(30) Foreign Application Priority Data
Jul. 26, 2006    (JP) .................. 2006-203785

(51) Int. Cl.
*H04N 5/50*    (2006.01)
*G09G 5/00*    (2006.01)
(Continued)

(52) U.S. Cl.
CPC ........... *H04N 5/44504* (2013.01); *H04N 5/775* (2013.01); *H04N 21/436* (2013.01);
(Continued)

(58) Field of Classification Search
CPC . H04N 5/44504; H04N 5/775; H04N 21/485; H04N 21/43615; H04N 21/43635; H04N 21/436
See application file for complete search history.

(56) References Cited

U.S. PATENT DOCUMENTS 4,998,292 A    3/1991    Eigeldinger et al.
5,969,727 A  * 10/1999   Kaneko .................. 345/536
(Continued)

FOREIGN PATENT DOCUMENTS

JP    2758174 B2    3/1998
JP    2004-32667 A    1/2004
(Continued)

OTHER PUBLICATIONS

High-Definition Multimedia Interface Specification Version 1.1 May 20, 2004, pp. CEC-22-CEC-25, CEC28-CEC30, CEC32-CEC33 and CEC-36.
(Continued)

*Primary Examiner* — Jefferey Harold
*Assistant Examiner* — Sean Haiem
(74) *Attorney, Agent, or Firm* — Birch, Stewart, Kolasch & Birch, LLP

(57) ABSTRACT

An AV device is provided that can automatically perform OSD display setting of other AV devices at a time based on local ODS display setting even when a plurality of AV devices are connected. The AV device (depicted as TV 1) includes a connection means (depicted as an HDMI connector 21 and an HDMI connector 22) for making connection with external AV devices 3 and 4 capable of performing OSD display, an OSD processing portion 23 for performing OSD display on a display 17, and a system controller 20 for controlling the entire system. The OSD processing portion 23 generates ODS display setting data 23a from the display setting such as a character color and size in OSD display received from a user using a TV remote controller 2 or the like and stores it. The system controller 20 transmits the OSD display setting data 23a for the TV 1 stored here to the external AV devices 3 and 4 via the HDMI connectors 21 and 22.

16 Claims, 5 Drawing Sheets

(51) Int. Cl.

| | | |
|---|---|---|
| *G06F 13/00* | (2006.01) | |
| *H04N 7/173* | (2011.01) | |
| *H04N 5/445* | (2011.01) | |
| *H04N 5/775* | (2006.01) | |
| *H04N 21/436* | (2011.01) | |
| *H04N 21/4363* | (2011.01) | |
| *H04N 21/485* | (2011.01) | |
| *H04N 5/765* | (2006.01) | |
| *H04N 5/85* | (2006.01) | |
| *H04N 21/422* | (2011.01) | |

(52) U.S. Cl.
CPC ... *H04N21/43615* (2013.01); *H04N 21/43635* (2013.01); *H04N 21/485* (2013.01); *H04N 5/765* (2013.01); *H04N 5/85* (2013.01); *H04N 21/42204* (2013.01)

(56) References Cited

U.S. PATENT DOCUMENTS

| | | | | |
|---|---|---|---|---|
| 6,215,467 | B1* | 4/2001 | Suga et al. | 345/660 |
| 7,466,363 | B2* | 12/2008 | Shimozawa et al. | 348/569 |
| 2002/0080278 | A1 | 6/2002 | Lee et al. | |
| 2002/0184652 | A1 | 12/2002 | Cezeaux | |
| 2003/0126326 | A1 | 7/2003 | Nomizo et al. | |
| 2003/0235397 | A1 | 12/2003 | Chu | |
| 2004/0223001 | A1 | 11/2004 | Peng | |
| 2005/0120383 | A1* | 6/2005 | Ozaki et al. | 725/131 |
| 2005/0246753 | A1 | 11/2005 | Milirud et al. | |
| 2007/0030524 | A1* | 2/2007 | Murakoshi | 358/403 |

FOREIGN PATENT DOCUMENTS

| | | |
|---|---|---|
| JP | 2005-51547 A | 2/2005 |
| JP | 3707433 B2 | 8/2005 |
| JP | 2005-351958 A | 12/2005 |
| TW | 331065 | 5/1998 |
| TW | 497358 | 8/2002 |
| TW | 503654 | 9/2002 |

OTHER PUBLICATIONS

High-Definition Multimedia Interface—Specification Version 1.2a, Dec. 14, 2005. 193 pps.

Supplementary European Search Report dated Aug. 31, 2011.

* cited by examiner

AV DEVICE

TECHNICAL FIELD

The present invention relates to an AV (Audio Visual) device, more specifically, to an AV device, including a TV (television) receiver, a content reproducing device, a content recording device, a content recording and reproducing device, an AV amplifier, and an STB (Set Top Box), which is capable of being connected to other AV devices by a digital interface such as an HDMI (High Definition Multimedia Interface).

BACKGROUND OF THE INVENTION

As a technology of video/audio transmission, there are a video/audio transmission system using MPEG compressed data based on the IEEE (Institute of Electrical and Electronics Engineers) 1394 standard, a component video transmission system of Y (luminance signal)/Pb (blue color difference signal)/Pr (red color difference signal) using a component terminal and a D video terminal, an optical digital audio transmission system in a digital audio format based on the IEC (International Electrotechnical Commission) 60958 standard and the IEC 61397 standard, and the like.

Furthermore, as an interface for high-speed transmission of digitized video signal between a computer main body and a display, the DVI (Digital Visual Interface) standard has been known.

The HDMI standard is a digital connection standard, which is a further improved version of the DVI standard, and an object thereof is to perform digital connection between an output device such as an STB and a display at home to meet the changes such as digitization of TV broadcast and a shift in a display device to a flat panel. The video/audio transmission in accordance with the HDMI standard is disclosed, for example, in the Patent Document 1.

In the HDMI, a function of transmitting audio signal and control signal is added to meet the requirement for TV uses. In the conventional connection between devices, a plurality of cables have been used for each signal of video, audio and control, however, since the HDMI standard needs only a single HDMI cable and the control signal is applicable to two-way transmission, it is also possible to operate the entire AV system (such as a home theater) with one remote controller by relaying the control signal to an output device such as an STB and a DVD player connected by the HDMI from a monitor.

Furthermore, in addition to the HDMI standard, there are the Display Port standard and the UDI (Unified Display Interface) standard as the improved version of the DVI standard. The UDI standard is different from the HDMI standard in terms of the fact that the UDI standard does not deal with audio signal, and the Display Port standard and the UDI standard are different from the HDMI standard in terms of the fact that the Display Port standard and the UDI standard are considered to perform the connections not only between devices but also within devices.

Meanwhile, a user often wants to perform not only display setting such as a character color and a font in the OSD (On Screen Display) display of a TV but also display setting such as a character color and a font in the OSD display of an AV device connected to the TV. Such display setting is suitable for preventing such a situation that a user can not know for which AV device the OSD operation is currently performed during setting.

In such a case, in the conventional technology for video/audio transmission as described above display setting is performed, by switching input to the TV to a target AV device, displaying a display setting screen of the AV device on a screen, and carrying out the operation using a remote controller (r/c) attached to the AV device.

Note that, the Patent Document 2 describes a technology of copying data regarding channel selection uniformly into a device to communicate with, and the Patent Document 3 describes a technology of copying various kinds of adjustment values uniformly between projectors.

Patent Document 1: Japanese Laid-Open Patent Publication No. 2005-51547
Patent Document 2: Japanese Patent No. 2758174
Patent Document 3: Japanese Patent No. 3707433

DISCLOSURE OF THE INVENTION

Problem to be Solved by the Invention

As has been described above, it is necessary that OSD display setting in an external AV device connected to a TV is carried out after switching input for each target external AV device. Hence, when the OSD display setting such as a character font and color is made common in the TV and the external AV devices, on the contrary and when the OSD display setting in the external AV devices is made directly opposite to the OSD display setting of the TV, it is necessary to perform respective setting by switching input for each TV and external AV devices.

In this way, the conventional technology requires that the OSD display setting is carried out for individual AV devices, and even when the OSD display setting is performed for one AV device among TV and external AV devices, it is impossible to reflect the setting on other AV devices.

Note that, the technology of the above-mentioned Patent Document 2 is a technology assuming that channel selection data is the same as data to be copied, and this can not certainly deal with a case, for example, that the OSD display setting of an external AV device is made directly opposite to OSD display setting of a TV. Moreover, the technology described in the Patent Document 3 is to copy adjustment values between the same kind of devices, projectors, where it is impossible to perform OSD display setting between different kinds of AV devices.

The present invention has been made in view of the above circumstances, and it is an object of the present invention to provide an AV device capable of automatically performing OSD display setting of other AV devices at a time based on local OSD display setting even when a plurality of AV devices are connected.

Means for Solving the Problem

In order to solve the above problem, a first technical means of the present invention is an AV device including a connection portion for connecting external AV devices capable of performing OSD display and an OSD display portion for performing OSD display on an external display device or an internal display device, comprising: a display setting portion for receiving display setting in the OSD display portion; a setting data generation portion for generating and storing OSD display setting data to be applied at the OSD display portion from display setting received by the display setting portion; and a setting data transmission portion for sending the OSD display setting data for the AV device stored by the setting data generation portion to the external AV devices through the connection portion.

A second technical means is the AV device as defined in the first technical means, wherein when the OSD display setting data to be transmitted is updated, the setting data transmission portion executes transmission of the updated OSD display setting data.

A third technical means is the AV device as defined in the first technical means, comprising an external setting data generation portion for generating, from the OSD display setting data for the AV device stored by the setting data generation portion, OSD display setting data for the external AV devices that has different display setting content from the OSD display setting data, wherein the setting data transmission portion sends OSD display setting data generated by the external setting data generation portion to the external AV devices, instead of the OSD display setting data for the AV device.

A fourth technical means is the AV device as defined in the third technical means, wherein the external setting data generation portion generates, from the OSD display setting data for the AV device stored by the setting data generation OSD display setting data for the external AV devices for each type that has different display setting content from the OSD display setting data and has common display setting content for each type of the external AV devices, and the setting data transmission portion sends the OSD display setting data for each type generated by the external setting data generation portion to each of the corresponding type of the external AV devices, instead of the OSD display setting data for the AV device.

A fifth technical means is the AV device as defined in the third technical means, wherein the external setting data generation portion generates, from the OSD display setting data for the AV device stored by the setting data generation portion, OSD display setting data for the external AV devices for each of the external AV devices that has different display setting content from the OSD display setting data, and the setting data transmission portion sends the OSD display setting data for each of the external AV devices generated by the external setting data generation portion to each of the corresponding external AV devices, instead of the OSD display setting data for the AV device.

A sixth technical means is the AV device as defined in any one of the third through the fifth technical means, wherein when the OSD display setting data for the AV device stored by the setting data generation portion is updated, the external setting data generation portion executes generation of the OSD display setting data for the external AV devices from the updated OSD display setting data for the AV device, and the setting data transmission portion executes transmission of OSD display setting data to be transmitted.

A seventh technical means is the AV device as defined in the first technical means, comprising: an external device display setting portion for receiving OSD display setting in the external AV devices and an external setting data generation portion for generating and storing OSD display setting data for external to be applied in OSD display at the external AV devices from the display setting received by the external device display setting portion, wherein the setting data transmission portion sends the OSD display setting data for external stored by the external setting data generation portion to the external AV devices through the connection portion, instead of the OSD display setting data for the AV device.

An eighth technical means is the AV device as defined in the seventh technical means, wherein the external device display setting portion receives OSD display setting in a target external AV device while displaying the OSD display setting data for external stored for other external AV devices by the external setting data generation portion and the OSD display setting data for the AV device stored by the setting data generation portion.

A ninth technical means is the AV device as defined in the seventh or the eighth technical means, wherein when the OSD display setting data for external to be transmitted is updated, the setting data transmission portion executes transmission of the updated OSD display setting data for external.

A tenth technical means is the AV device as defined in any one of the first through the third and the seventh technical means, comprising: a setting data receiving portion for receiving the OSD display setting data for the AV device from the external AV devices through the connection portion; and a setting data storage portion for storing the OSD display setting data received by the setting data receiving portion to be applied at the OSD display portion.

An eleventh technical means is the AV device as defined in the first or the second technical means, comprising: a setting data receiving portion for receiving the OSD display setting data for the AV device from the external AV devices through the connection portion; a setting data regeneration means for regenerating the OSD display setting data that has different display setting content from the OSD display setting data from the OSD display setting data received by the setting data receiving portion; and a setting data storage portion for storing the OSD display setting data regenerated by the setting data regeneration portion to be applied at the OSD display portion.

A twelfth technical means is the AV device as defined in any one of the first through the third and the seventh technical means, wherein the display setting includes a part or all of setting among setting of a color, setting of a type and setting of a size with respect to characters, graphics and symbols in OSD display.

A thirteenth technical means is the AV device as defined in any one of the first through the third and the seventh technical means, wherein the display setting is a part or all of setting of characters, graphics, symbols, frames and languages in OSD display.

A fourteenth technical means is the AV device as defined in any one of the first through the third and the seventh technical means, wherein the connection portion is portion for performing connection in accordance with the HDMI standard, and the setting data transmission portion is portion for sending OSD display setting data as a CEC command.

A fifteenth technical means is the AV device as defined in any one of the first through the third and the seventh technical means, comprising: a reproduction setting portion for receiving reproduction setting at the time of video/audio reproduction; and a reproduction setting data generation portion for generating and storing reproduction setting data to be applied at the time of video/audio reproduction from the reproduction setting received by the reproduction setting portion, wherein the setting data transmission portion sends reproduction setting data for the AV device stored by the reproduction setting data generation portion to the external AV devices together with OSD display setting data to be transmitted through the connection portion.

A sixteenth technical means is the AV device as defined in the fifteenth technical means, wherein the connection portion is portion for performing connection in accordance with the HDMI standard, and the setting data transmission portion is portion for sending the OSD display setting data and reproduction setting data as a CEC command.

A seventeenth technical means is the AV device as defined in any one of the first through the third and the seventh technical means, wherein the AV device is a television receiver including the internal display device, and the external AV devices are any of a reproducing device for reproducing video/audio, a recording device for recording video/audio, a recording and reproducing device for recording and reproducing video/audio, an AV amplifier, and a set top box.

An eighteenth technical means is the AV device as defined in any one of the first through the third and the seventh technical means comprising a warning portion for warning that display setting changes before transmission by the setting data transmission portion to the connected external AV devices is performed when the external AV devices are connected by the connection portion.

A nineteenth technical means is the AV device as defined in any one of the first through the third and the seventh technical means comprising a confirmation portion for confirming whether to change display setting, before transmission by the setting data transmission portion to the connected external AV devices is performed when the external AV devices are connected by the connection portion, wherein the setting data transmission portion does not execute transmission by the setting data transmission portion when the confirmation portion does not allow change of display setting.

A twentieth technical means is the AV device as defined in any one of the first through the third and the seventh technical means, wherein the connection portion is portion for performing connection in accordance with the HDMI standard, and the AV device includes portion for obtaining, using a CEC command, a part or all of a device name, a logical address, a physical address, an input/output terminal name, a state, and setting information in the external AV devices.

Effect of the Invention

According to the present invention, in an AV device even when a plurality of AV devices are connected, it is possible to automatically perform OSD display setting of other AV devices at a time based on a user's OSD display setting.

EXPLANATIONS OF REFERENCE NUMERALS

1 . . . TV, 2 . . . remote controller (R/C), 3 . . . AV amplifier I, 4 . . . recorder I, 5 . . . STBI, 6 . . . player I, 7 . . . player II, 8 . . . STB II, 9 . . . recorder II, 10 . . . tuner and demodulation portion, 11 . . . TS-Demux, 12 . . . A/V decoder, 13 . . . A/V output control portion, 14 . . . audio signal processing portion, 15 . . . speaker, 16 . . . video signal processing portion, 17 . . . display, 18 . . . device selection table, 19 . . . remote controller receiving portion, 20 . . . system controller, 21,22, 31,41 . . . HDMI connecter, 23,33,43 . . . OSD processing portion, 23a,33a,43a . . . OSD display setting data, 30,40 . . . CPU, 32,42 . . . AV signal processing portion

PREFERRED EMBODIMENTS OF THE INVENTION

Figure 1:
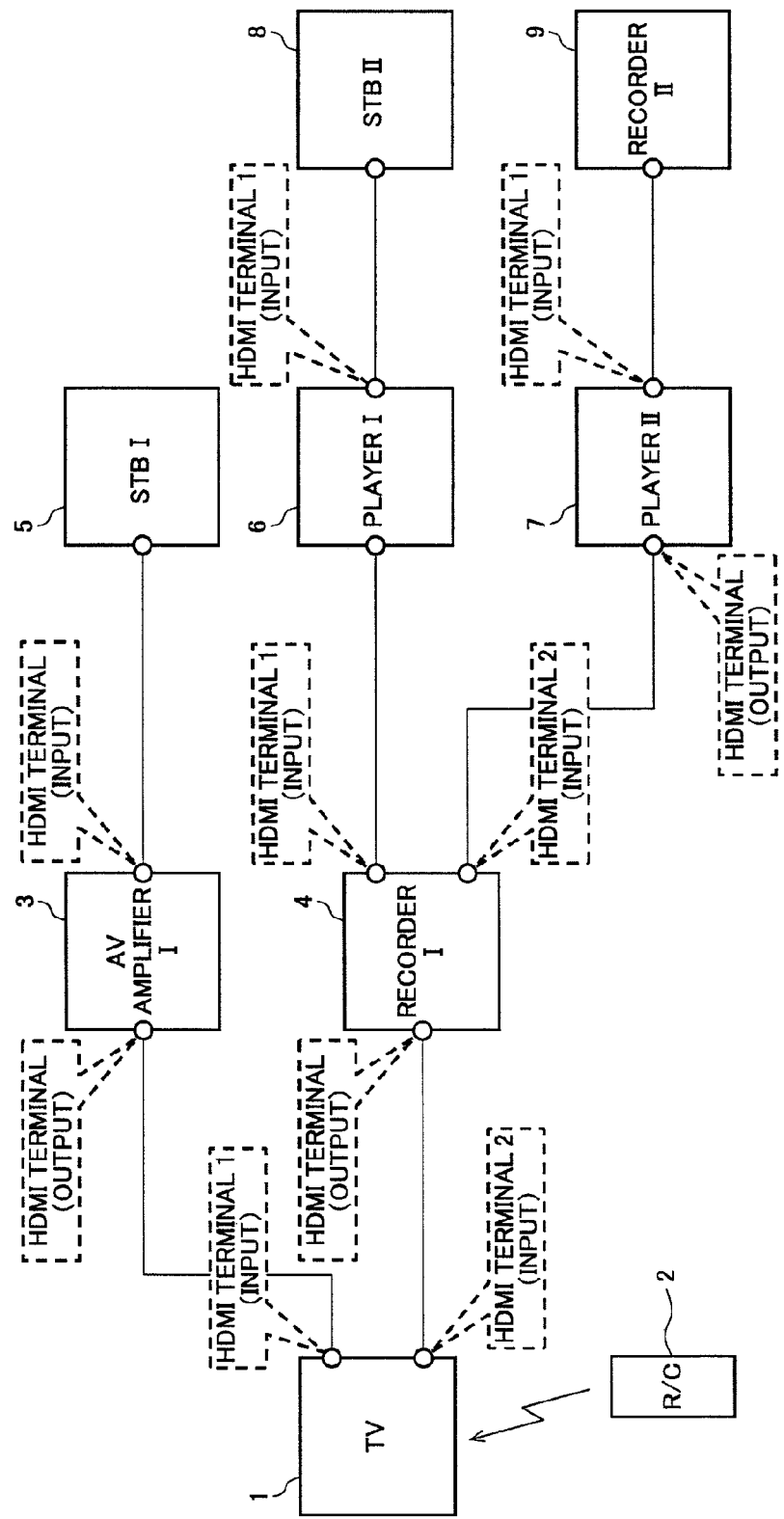
FIG. 1 is a view showing an example of the system structure including an AV device (TV) according to an embodiment of the present invention.
Figure 2:
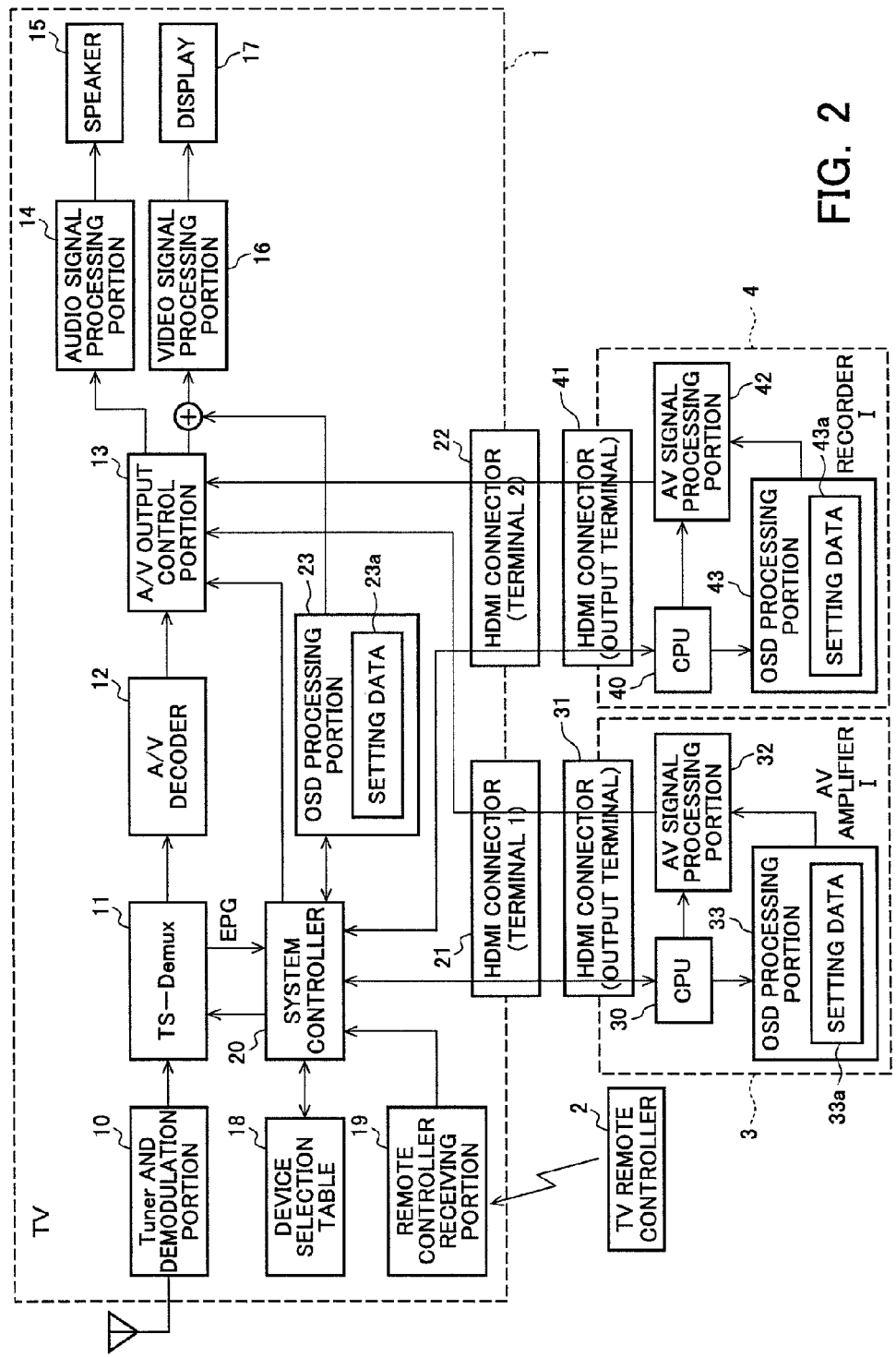
FIG. 2 is an internal block diagram showing a structural example of the AV device (TV) of FIG. 1.
Figure 3:
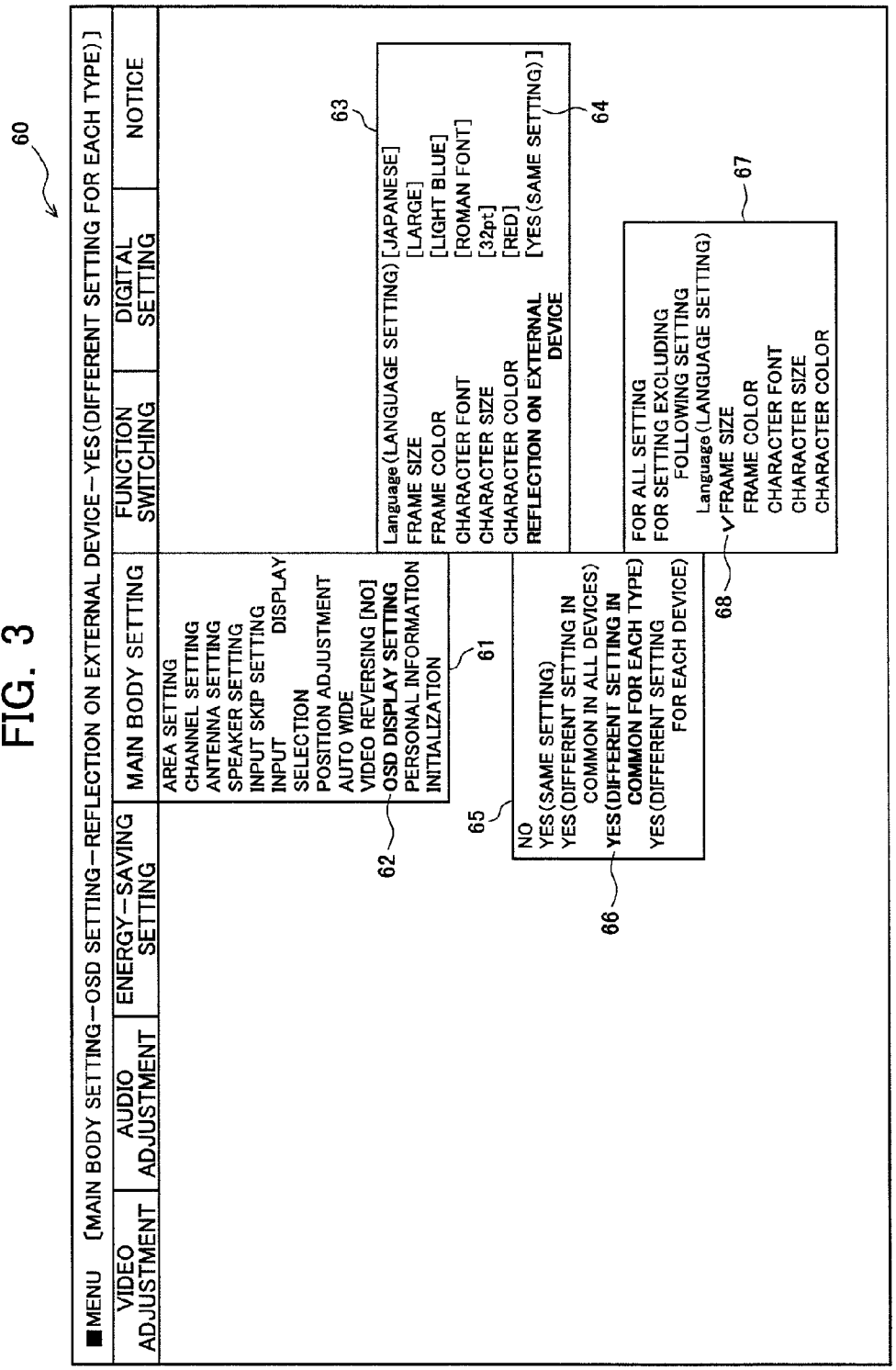
FIG. 3 is a view showing an example of a menu screen (OSD display setting screen) in the AV device (TV) of FIG. 2.

FIG. 1 is a view showing an example of the system structure including an AV device (TV) according to an embodiment of the present invention, and FIG. 2 is an internal block diagram showing a structural example of the AV device (TV) of FIG. 1. In addition, FIG. 3 is a view showing an example of a menu screen (OSD display setting screen) in the AV device (TV) of FIG. 2.

The AV device according to the present invention is capable of automatically performing OSD display setting processing of external AV devices connected to a network, which will be described taking a TV (TV receiver) 1 as an example, as illustrated in FIGS. 1 and 2.

Furthermore, FIG. 1 illustrates a multi stage system in which, as the external AV devices, reproducing devices (players) 6 and 7 for reproducing video/audio, recording devices (recorders) 4 and 9 for recording video/audio, an AV amplifier (an AV center for home theater) 3 that is capable of inputting/outputting video signal with a function of selector for treating audio signal of channels, including front-left/right, surround left/right, and center woofers, and STBs 5 and connected to the TV 1 so as to be able to receive various services are connected.

The TV 1 illustrated in FIG. 1 includes a tuner and demodulation portion 10 that tunes (selects) a signal of digital broadcast received with an antenna and demodulates data of the tuned digital broadcast, a TS-Demux (TS separator) 11 that separates TS (Transport Stream) data which is the digital broadcast data output from the tuner and demodulation portion 10 into video data and audio data, and an A/V decoder 12 that decodes each of the video data and the audio data output by the TS separator 11.

Furthermore, in the TS separator 11, EPG (Electronic Program Guide) data is also separated (extracted) from the digital broadcast data, outputs the EPG data to a system controller 20 (described later), and after being processed at an OSD processing portion 23 (described later) and the like, the EPG can be displayed on a display 17. Note that, when receiving another broadcast such as analogue broadcast and satellite broadcast, an antenna, a tuner, a demodulation portion and the like may be similarly provided in the TV 1.

Furthermore, the TV 1 includes an A/V output control portion 13, an audio signal processing portion 14, a speaker 15, a video signal processing portion 16 and the display 17. The A/V output control portion 13 performs control to switch output according to a selection control from the system controller 20 (described later), among decoded video data and audio input from the A/V decoder 12, video data and audio data input from an HDMI connector 21 and an HDMI connector 22, which will be described below, video/audio data input from a not-shown connector, decoded video/audio data of broadcast, and the like. Note that, in the case of the HDMI standard, video data (video signal) sent from an AV signal processing portion 32 and an AV signal processing portion 42 is transmitted in a mode called as TMDS (Transition Minimized Differential Signaling) to the A/V output control portion 13.

The audio signal processing portion 14 applies processing such as amplification and equalization to the audio data among the audio data and video data selected by the A/V output control portion 13, and the speaker 15 outputs the audio data output from the audio signal processing portion 14 as sound.

The video signal processing portion 16 applies various kinds of audio processing such as scaling, movement correction and γ processing to the video data among the audio data and video data selected by the A/V output control portion 13, and the display 17 outputs the video data output from the video signal processing portion 16 as video. The display 17 included in the TV 1 may be any type of display devices, including a liquid crystal display device and a plasma panel display.

Moreover, the TV 1 includes a TV remote controller for sending various kinds of user operations to a main body side of the TV 1, a remote controller receiving portion 19 for receiving operation signal sent from the TV remote controller 2, and the system controller 20 for receiving the operation signal received by the remote controller receiving portion 19 to execute processing corresponding to the operation. Note that, instead of or in combination with the TV remote controller 2 and the remote controller receiving portion 19, an operation button for receiving various kinds of user operations and the like may be provided in the main body side of the TV 1. Moreover, in the TV remote controller 2 and the remote controller receiving portion 19, other general operations as a TV, including channel selection, are also possible.

The system controller 20 controls each portion within the TV 1 to execute not only processing of responding to such an operation but also entire processing including the processing of automatic OSD display setting, which is a main characteristic part of the present invention. The system controller 20 includes a CPU (Central Processing Unit), a RAM (Random Access Memory) that serves as a work area of the CPU to read a program stored in a nonvolatile memory (described later) or to temporarily store data in processing, a control program for controlling various kinds of processing including the processing of automatic OSD display setting of the present invention, a rewritable nonvolatile memory in which various kinds of data such as EPG data and user data is stored, and the like. Instead of the control program, a hardware for performing a similar control may be certainly incorporated in the system controller 20.

Furthermore, the TV 1 includes OSD display means for performing OSD display in an internal display device (display 17), and this means is mainly illustrated in FIG. 2 as the OSD processing portion 23 and the system controller 20 for performing control thereof.

With control from the system controller 20 caused by a user operation with the TV remote controller 2 and the like and based on OSD display setting data 23a at the time of OSD display stored in an internal storage area or within the system controller 20, the OSD processing portion 23 performs processing of displaying OSD data (sometimes including EPG data) which is previously stored similarly or received at the time of receiving broadcast. The OSD data processed at the OSD processing portion 23 is subjected to superposing processing on video data at a previous stage (or a later stage) of the video signal processing portion 16 so that the video data after superposing can be output by the display 17. The OSD processing portion 23 may be composed of an OSD processing program that is executable at the system controller 20 or may be composed of a hardware.

A bitmap and the like can be employed as the OSD data output from the OSD processing portion 23, and for example, a menu screen 60 itself in FIG. 3, a mere volume adjustment screen, a luminance adjustment screen, a timer setting screen and the like are also included. On the menu screen 60 illustrated in FIG. 3, respective items, including a video adjustment item, a sound adjustment item, an energy-saving setting item, a main body setting item, a function switching item, a digital setting item and a notice, are displayed so as to be able to shift to setting in each item by pull-down.

The TV 1 includes a connection means (communication interface) for connecting to external AV devices 3 to 9 capable of performing OSD display. As a preferable example of the connection means, the HDMI connector 21 and the HDMI connector 22 are illustrated. The HDMI connector 21 and the HDMI connector 22 are means for performing connection complying with the HDMI standard, which can easily realize connection state such as to which stage (to which layer) the external AV devices 3 to 9 are connected, but the connection means is not limited thereto. For example, connectors complying with the IEEE 1394 standard or the UDI standard may be employed. However, it is necessary to take a measure corresponding to each standard, for example, when the UDI standard is employed, a transmission line for audio signals must be additionally provided, and when the IEEE 1394 standard is employed, grasp processing of connection state or transmission processing which is necessary when sending OSD display setting data according to the present invention (described later) must be added.

Note that, the processing of automatic OSD display setting described here may be executed by other AV devices in the system structure of FIG. 1, and the AV device according to the present invention is therefore not limited to being a TV. However, when the present invention is applied to an AV device in a type other than the TV 1, it is different in the respect that the OSD display means serves as means for performing OSD display on an external display device (for example, the TV 1). In addition, the external display device serves as one of external AV devices. However, like the example of the system structure in FIG. 2, the AV device according to the present invention may be preferably provided at an environment where it is possible to grasp connection state with external AV devices or to specify external AV devices, for example, by providing in an upstream of the respective external AV devices like the TV 1. Note that, in CEC connection (described later), it is possible to grasp connection state or to specify devices regardless of discrimination between upstream or downstream.

Furthermore, the TV 1 includes a display setting means for receiving display setting in the OSD display means from a user. The display setting means may be composed such that a display setting operation can be performed in the TV remote controller 2, and signal of the display setting operation received by the remote controller receiving portion 19 is received, or signal of the display setting operation from the display setting operation button provided in the TV 1 main body side is received, and display setting processing corresponding to the received signal can be executed at the system controller 20. In addition, the display setting means also includes, as component thereof, the OSD processing portion 23 for generating OSD data to be displayed on an operation screen, the display 17 for displaying the OSD data, and the like, in order to support an operation with the TV remote controller 2.

When a user selects the main body setting item using the TV remote controller 2 or the like out of the respective setting items on the menu screen 60 of FIG. 3, a setting item list 61, including area setting and channel setting, is displayed. In the example of FIG. 3, an OSD display setting item 62 is also displayed in this setting item list 61, and, in this way, the display setting means can be composed as a user operation portion of the TV remote controller 2 and a graphical user interface (GUI) for receiving a user operation while displaying a screen lower than the OSD display setting item 62.

In the OSD display setting item 62, as an OSD display setting item list 63, respective items of language setting, size/color of a frame in OSD display, a type/size/color of characters, figures and symbols, and "reflection on external devices" 64 are displayed. Here, a type of characters and symbols indicates a font. In addition, setting of the type of figures indicates a setting that determines which type of figure group of figure groups created with the same tendency is used for performing the OSD display. Note that, in FIG. 3, setting only for characters among characters, figures and symbols is shown. In the respective items, each setting value can be selected and input, or can be input by selection.

"Reflection on external devices" 64 serves as an item in which whether or not other display setting items set in the TV 1 are applied to the external devices 3 to 9 is set when the processing of automatic OSD display setting according to the present invention is executed. First, description will be given assuming that the setting is to be reflected.

In this way, the display setting may be performed so as to include a part or all of setting among color setting, setting of a font as a type of character, and setting of a font size with respect to characters in OSD display (in OSD menu display). Here, instead of the character setting or in addition to the character setting, a part or all of setting among setting of a color, a type and a size may be also included with respect to figures and/or symbols in OSD display. Moreover, the display setting may be a part or all of setting among characters, figures, symbols, frames and languages in OSD display. As will be described below, by reflecting the display setting to make a color, a size and a type of characters, figures and symbols, a color and a shape of frames in common, a sense of unity is given, and alternatively by making them different in another embodiment, it is possible to easily distinguish external AV devices.

The TV 1 includes a setting data generation means and a setting data transmission means as a main characteristic part of the present invention. The setting data generation means generates OSD display setting data (setting data) 23a to be applied in OSD display by the OSD display means from the display setting received by the system controller 20 and stores the data in a storage area within the OSD processing portion 23 or within the system controller 20 (the above-mentioned nonvolatile memory and the like).

The setting data transmission means is composed of the system controller 20, the HDMI connector 21 and the HDMI connector 22, and the system controller 20 reads out the OSD display setting data 23a for the TV 1 stored by the setting data generation means and sends (the data) to an AV amplifier I (3) and a recorder I (4), respectively through the HDMI connector 21 and the HDMI connector 22.

For example, with respect to the AV amplifier I (3) the system controller 20 obtains connection state of the AV amplifier I (3) and the external AV device (an STBI (5) herein) which is connected at a downward thereof, from the HDMI connector within the AV amplifier I (3) via a CEC (Consumer Electronics Control) network to specify the devices, and the system controller 20 similarly sends the OSD display setting data 23a to the CPU 30 via the CEC network. Note that, although it is illustrated that transmission/reception of a CEC command (message) is performed between the system controller 20 and the CPU 30 or the like, the transmission/reception of the CEC command is actually to be performed between built-in or externally provided CEC controllers.

The connection state of the external AV devices 3 to 9 may be obtained in each time, or may be obtained at appropriate time and store in the device selection table 18 as device information to obtain from the device selection table 18. In addition, the system controller 20 may select a device targeted for transmission from the external AV devices 3 to 9 referring to the device selection table 18 to execute the transmission.

In order to specify devices, the TV 1 may be provided with a means for obtaining, a part or all of information of a device name, a logical address showing a device type, a physical address showing a device position, an input/output terminal name, a state, and setting information in each of the external AV devices using a CEC command (including one provided as a CEC vendor command). When the TV 1 obtains such information, an inquiry is made for each logical address using a CEC command (including one provided as a CEC vendor command), and an external AV device having a corresponding logical address returns a transmission to the TV 1, all or a part of information of a device name, a logical address (device type), a physical address (device position), an input/output terminal name, a device state and device setting information in accordance with content of the command. In addition, when the TV 1 obtains such information, it is also possible to obtain the above-mentioned information by simultaneously making inquiry to all of the external AV devices having a logical address using a CEC broadcast command. Moreover, even if the TV 1 makes no inquiry, it is also possible that the external AV device that has obtained a logical address notifies the TV of the above-mentioned information using a CEC command (including one provided as a CEC vendor command).

It is preferable that the OSD display setting data 23a targeted for transmission is sent as a CEC command after performing conversion to a command (CEC command) having the same setting content as setting content shown by the OSD display setting data 23a for the TV 1 at the time of storage or at the time of transmission. However, since such OSD display setting data 23a is not provided as a usual CEC command, a command provided as a CEC vendor command may be correspondingly used as the CEC command herein.

In the present embodiment, execution may be made, for example, when "Yes (same setting)" is set among respective items displayed as a setting item list 65 regarding "reflection on external devices" 64 in FIG. 3 of "No", "Yes (same setting)", "Yes (different setting in common in all devices), "Yes (different setting in common for each type)" 66, "Yes (different setting for each device)". In order to set details of "Yes (same setting)", a setting item list 67 may be displayed to receive a user operation. The setting item list 67 makes a display to allow setting of whether to make display setting in all of the external AV devices 3 to 9 the same as the display content of the OSD display setting data 23a for the TV 1 for "all setting (all display setting items)" or to make display setting in all of the external AV devices 3 to 9 the same as the display content excluding a part of setting content (display content) of the OSD display setting data 23a for the TV 1 for "setting excluding following setting". The display content excluding a part can be realized by composing a CEC command of only items corresponding to display content targeted for setting.

The AV amplifier I (3) that received the OSD display setting data 23a rewrites the OSD display setting data 33a of an internal OSD processing portion 33. Thereby, the OSD processing portion 33 outputs OSD data to the AV signal processing portion 32 (actually to a video signal processing portion) based on the OSD display setting data 33a. When OSD display of the AV amplifier I (3) is made in the TV 1, the OSD processing portion 33 generates the OSD data (for example, bitmap data) to output to the AV signal processing portion 32 in this way, and outputs the data as video data to the A/V output control portion 13 via the HDMI connector 21 through the HDMI connector 31 under the control of the CPU 30, and then the system controller 20 turns output switch to the AV amplifier I (3), thereby displaying on the display 17.

In this way, each of the external AV devices 3 to 9 connected to the AV device (TV 1) according to the present invention includes following setting data receiving means and setting data storage means. The setting data receiving means is a means for receiving the OSD display setting data 23a for the TV 1 from the TV 1 through the above-mentioned connection means, and is composed of the CPU 30, a control target program thereof and the like. In addition, the setting data storage means is a means for storing the OSD display setting data 23a received by the setting data receiving means as the OSD display setting data 33a to be applied in OSD display at the OSD processing portion 33. Here, the setting data storage means stores such OSD display setting data 33a that display setting content as is shown by the received OSD display setting data 23a can be finally applied in OSD display. Moreover, although description has been given for the external AV devices 3 to 9, it is desirable for the TV 1 to include similar setting data receiving means and setting data storage means for the case that the TV 1 itself functions as an external AV device.

Furthermore, the processing of obtaining connection state and the processing for the case when the OSD display setting data 23a is received are similarly to those performed in a recorder I (4) including a CPU 40, an OSD processing portion 43 in which OSD display setting data 43a is stored, an AV signal processing portion 42 and an HDMI connector 41.

In the setting data transmission means, the OSD display setting data 23a is further sent to an STBI (5) which is a lower external AV device through the AV amplifier I (3), sent to a player I (6) and a player II (7) which are lower external AV devices through a recorder I (4), sent to an STB II (8) which is a lower external AV device through the player I (6), and then sent to a recorder II (9) which is a lower external AV device through the player II (7). In this way, the setting data transmission means sends the OSD display setting data 23a for the TV 1 as is to each of the external AV devices 3 to 9. Moreover, the processing of obtaining connection state and the processing for the case when the OSD display setting data 23a is received are similar to those performed in a lower external AV device having at least the similar structure to that of the AV amplifier I (3) and the recorder I (4).

In this way, each of the external AV devices 3 to 9 receives the OSD display setting data 23a sent by the setting data transmission means and performs OSD display setting using the received OSD display setting data 23a. In this way, in the TV 1, it is possible, using the CE network, to send OSD setting information of a device (TV 1) also to other devices (external AV devices 3 to 9) and to automatically perform setting in the other devices (external AV devices 3 to 9) at a time. That is, the respective AV devices in the system illustrated in FIG. 1 are capable of recognizing each other, and thereby, it is possible to reflect the display setting once set in the TV 1 from the TV 1 side (master side) also on the external AV devices 3 to 9 and therefore, setting works performed for each of the external AV devices 3 to 9 can be omitted.

Note that, when an external AV device not requiring OSD display setting is directly or indirectly connected to the TV 1, for example, when the AV amplifier I (3) is a device incapable of performing OSD display and therefore does not require OSD display setting, the setting data transmission means may exclude the external AV device from a target for transmission.

Furthermore, when the OSD display setting data 23a targeted for transmission is updated, it is desirable for the setting data transmission means to execute the transmission of the updated OSD display setting data 23a. Thereby, display setting switched for the TV 1 from the TV 1 side (master side) is also reflected on the external AV devices 3 to 9 in real time to make it possible to switch the OSD display setting in the external AV devices to 9 as well and to omit setting works to be performed for each of the external AV devices 3 to 9.

Furthermore, in the above-mentioned embodiment, description has been given assuming that the external AV devices 3 to 9 receive the OSD display setting data 23a sent from the TV 1 to reflect the display setting as it is, however, as another embodiment of the present invention, the external AV devices 3 to 9 may especially store display setting different from the received OSD display setting data 23a to reflect.

In the case of this embodiment, each of the external AV devices 3 to 9 connected to the TV 1 includes the above-mentioned setting data receiving means, and includes following setting data regeneration means and setting data storage means. Taking the AV amplifier I (3) as an example, the setting data regeneration means is a means for regenerating, the OSD display setting data 33a that has display setting content different from the OSD display setting data 23a from the OSD display setting data 23a received by the setting data receiving means, and is composed of the CPU 30, a control target program thereof, and the like. The setting data regeneration means may be, for example, incorporated in the system controller 20 and the OSD processing portion 33.

The setting data storage means in the present embodiment is a means for storing the OSD display setting data 33a regenerated by the setting data regeneration means to be applied in OSD display at the OSD processing portion 33. Here, the setting data storage means stores such OSD display setting data 33a that display setting content different from display setting content shown by the received OSD display setting data 23a can be finally applied in OSD display.

For example, even when setting to display using OSD color/font based on white is made in the TV 1, a recorder device is able to display using OSD color/font based on red different from white by predetermined amount as color data, or a player is able to display using OSD color/font based on green different by another predetermine amount. Moreover, although description has been given for the external AV devices 3 to 9, the TV 1 may include similar setting data, receiving means and setting data storage means for the case that the TV 1 itself performs as an external AV device.

In each of the above-mentioned embodiments, a mode where the OSD display setting data 23a of the TV 1 itself is sent from the TV 1 to the external AV devices 3 to 9 has been employed, however, as an alternative method, another embodiment of the present invention may be provided so that OSD display setting data for external AV devices whose display setting content is different from the OSD display setting data of the TV 1 itself is sent from the TV 1. Here, the OSD display setting data for the external AV devices 3 to 9 to be sent is referred to as OSD display setting data 23b (not shown) for distinguishing from the OSD display setting data 23a for the TV 1.

In the embodiment, execution may be made, for example, when any one of items in FIG. 3 including "Yes (different setting in common in all devices)", "Yes (different setting in common for each type)" 66 and "Yes (different setting for each device)" is set. Among these items, a case where "Yes (different setting in common in all devices)" is set, which will not be additionally described below, is described. In order to set details for "Yes (different setting in common in all devices)", the setting item list 67 may be displayed to receive a user operation. The setting item list 67 makes a display to allow setting whether to differentiate display setting common in all of the external AV devices 3 to 9 from display content of the OSD display setting data 23a of the TV 1 for "all setting (all display setting items)", or to differentiate display setting common in all of the external AV devices 3 to 9 from display content excluding a part of display content of the OSD display setting data 23a of the TV 1 for "setting excluding following setting".

The TV 1 in the present embodiment includes following external setting data generation means. The external setting data generation means is a means for generating, OSD display setting data 23b for the external AV devices 3 to 9, whose display setting content is different from the OSD display setting data 23a from the OSD display setting data 23a for the TV 1 stored (or may be temporarily stored) by the setting data generation means, and can be, for example, incorporated in the system controller 20 and the OSD processing portion 23. In addition, the setting data transmission means in the present embodiment sends the OSD display setting data 23b generated by the external setting data generation means to the external AV devices 3 to 9, instead of the OSD display setting data 23a for the TV 1.

As described above, the respective AV devices in the system illustrated in FIG. 1 are capable of recognizing to one aother, thus making it possible to send the OSD display setting data 23b sent from the TV 1 side (master side) to the external AV devices 3 to 9 and perform display setting while keeping the display setting content shown by the OSD display setting data 23b, namely the display setting different from the display setting of the TV 1, in each of the external AV devices 3 to 9.

Furthermore, in the present embodiment as well, it is preferable to reflect the OSD display setting data 23a for the TV 1 stored by the setting data generation means, when it is updated, on the external AV devices 3 to 9 in real time. That is, when such update is made, the external setting data generation means executes generation of the OSD display setting data 23b for external AV devices from the updated OSD display setting data 23a for the TV 1 and the setting data transmission means executes transmission of the OSD display setting data 23b targeted for the transmission.

Furthermore, the OSD display setting data 23b for external AV devices generated by the external setting data generation means may be generated so as not only to have different display setting content from the OSD display setting data 23a but also to be data for each type having common display setting content for each type (recorder/player/AV amplifier/STB and the like) of the external AV devices 3 to 9.

In this example, execution may be made when the item of "Yes (different setting in common for each type)" 66 of FIG. 3 is set. In order to set details for "Yes (different setting in common for each type)" 66, the above-mentioned setting item list 67 may be displayed to receive a user operation. The setting item list 67 makes a display to allow setting of whether to differentiate common display setting for each type of the external AV devices 3 to 9 from display content of the OSD display setting data 23a of the TV 1 for "all setting (all display setting items)", or to differentiate common display setting for each type of the external AV devices 3 to 9 from display content excluding a part of display content of the OSD display setting data 23a of the TV 1 for "setting excluding following setting".

In addition, the setting data transmission means transmits the OSD display setting data 23b for each type generated by the external setting data generation means to corresponding types of external AV devices, respectively.

In CEC connection, it is possible to recognize that as what type of devices each device is connected, including recorder/STB/player, from the TV 1 side (master side), and also to recognize the TV 1 from each connected device. Note that, when using a network other than the CEC network, it is basically impossible to classify external AV devices for each type, for example, by the IEEE 1394 standard, and when such means is employed as the connection means, it is necessary to incorporate a program for distinguishing types.

As described above, the respective AV devices in the system illustrated in FIG. 1 are capable of recognizing each other, and therefore, it is possible to customize and send OSD display setting data 23b sent from the TV 1 side (master side) depending on types of the external AV devices 3 to 9. In addition, each of the external AV devices 3 to 9 in the receiving side is able to perform display setting (display setting customized for each type) while keeping the display setting content shown by the OSD display setting data 23b. For example, even when setting to display using OSD color/font based on white is made in the TV 1, it is also possible to send the OSD display setting data 23b so that a recorder device displays using OSD color/font based on red different from white by predetermined amount as color data, or a player displays using OSD color/font based on green different by another predetermine amount.

Furthermore, the OSD display setting data 23b for external AV devices generated by the external setting data generation means may be generated so as not only to have different display setting content from the OSD display setting data 23a but also to be data for each of the external AV devices 3 to 9.

In this example, execution may be made when the item of "Yes (different setting for each device)" of FIG. 3 is set. In order to set details for "Yes (different setting for each device)", the above-mentioned setting item list 67 may be displayed to receive a user operation. The setting item list 67 makes a display to allow setting of whether to differentiate display setting in each of the external AV devices 3 to 9 and differentiate display content from the OSD display setting data 23a of the TV 1 for "all setting (all display setting items)", or to differentiate display setting in each of the external AV devices 3 to 9 and differentiate from display content excluding a part of the OSD display setting data 23a of the TV 1 for "setting excluding following setting".

In addition, the setting data transmission means sends the OSD display setting data 23b for each external AV devices 3 to 9 generated by the external setting data generation means to the corresponding external AV devices 3 to 9, respectively. In this embodiment, it is possible to perform display setting for each of the external AV devices 3 to 9 in more detail, compared with display setting for each type.

Each of the above-mentioned embodiments employs a mode where, TV 1 sends the OSD display setting data 23a as is or the OSD display setting data 23b based on the OSD display setting data 23a of the TV 1 itself, however, as another embodiment of the present invention, TV 1 may send OSD display setting data to each of the corresponding external AV devices 3 to 9 after a user set OSD display setting data exclusive for each of the external AV devices 3 to 9 in the TV 1. Here, the OSD display setting data for the external AV devices 3 to 9 to be set and sent is referred to as OSD display setting data 23c (not shown) for distinguishing from the OSD display setting data 23a for the TV 1 and the OSD display setting data 23b for the external AV devices 3 to 9 generated from the data 23a.

Although an example of such setting screen is not illustrated, a list of items composed of the TV 1 itself and currently connected external AV devices 3 to 9 may be displayed as a list of detailed setting items for the OSD display setting item 62 in FIG. 3 and the OSD display setting item list 63 may be displayed as a list of detailed setting items subsequent thereto.

The TV 1 in the present embodiment includes following external device display setting means and external setting data generation means. The external device display setting means is a means for receiving OSD display setting in the external AV devices 3 to 9, and can be formed similarly to the above-mentioned display setting means.

The external setting data generation means in the present embodiment is a means for generating and storing the OSD display setting data 23c for external to be applied in OSD display in the external AV devices 3 to 9 from the display setting received by the external device display setting means, and can be incorporated, for example, in the system controller 20 and the OSD processing portion 23. In addition, the setting data transmission means in the present embodiment sends the OSD display setting data 23c for external stored by the external setting data generation means to each of the corresponding external AV devices 3 to 9, instead of the OSD display setting data 23a for the TV 1. Note that, the OSD display setting data 23c for external to be sent here finally equals to the OSD display setting data 23b for each of the external AV devices 3 to 9.

Here, the external device display setting means preferably receives OSD display setting in target external AV devices while displaying the OSD display setting data for external stored for other external AV devices and the OSD display setting data 23a stored for the TV 1. Such reception of the display setting is possible because the OSD display setting data 23c for other external AV devices is also set and stored. Furthermore, in the present embodiment as well, it is preferable that update of data is reflected in real time. That is, when the OSD display setting data 23c for external targeted for transmission is updated, the setting data transmission means executes transmission of the updated the OSD display setting data for external.

Figure 4:
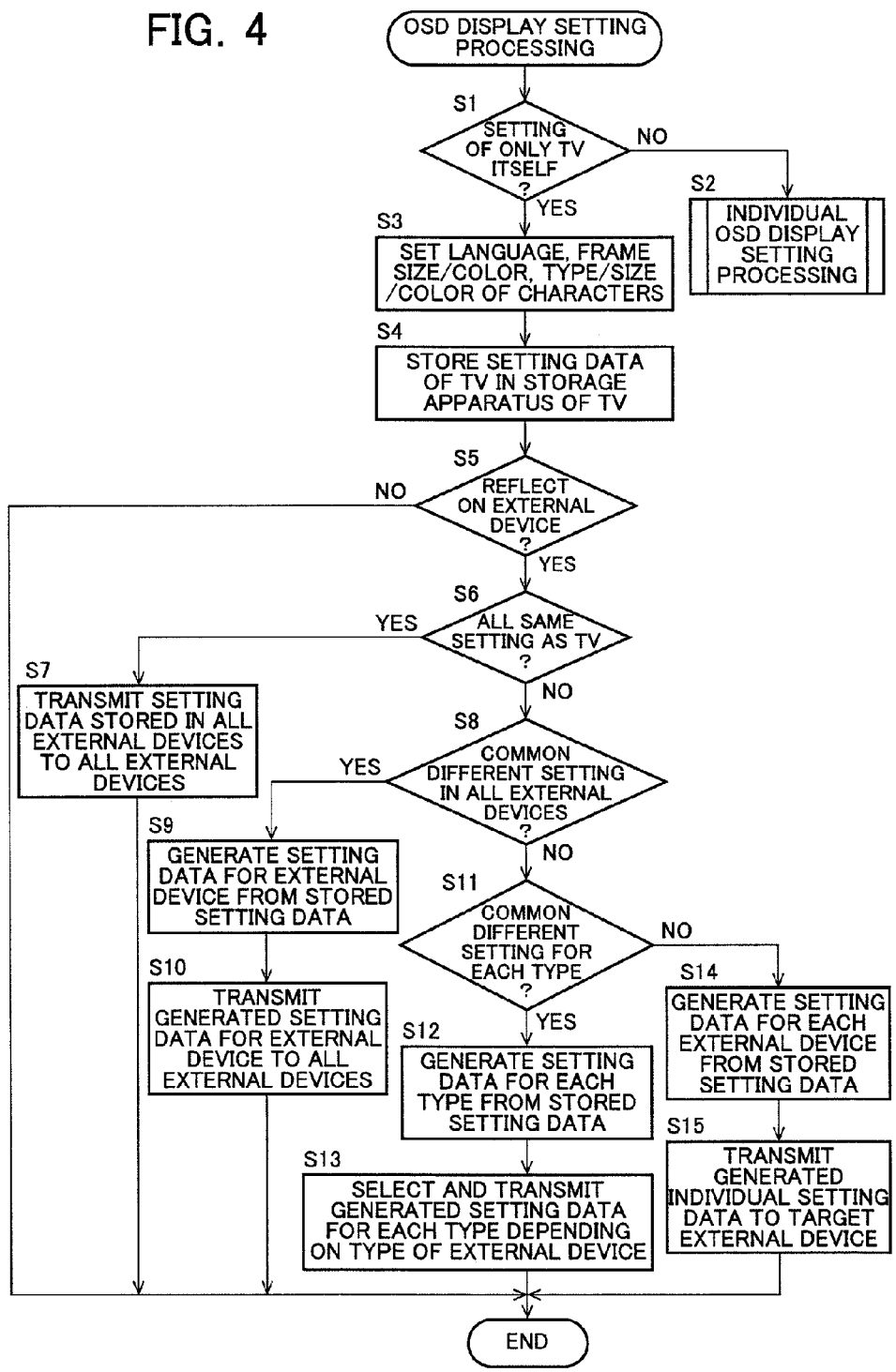
FIG. 4 is a flowchart illustrating an example of display setting on the OSD display setting screen of FIG. 3 and transfer processing thereof.
Figure 5:
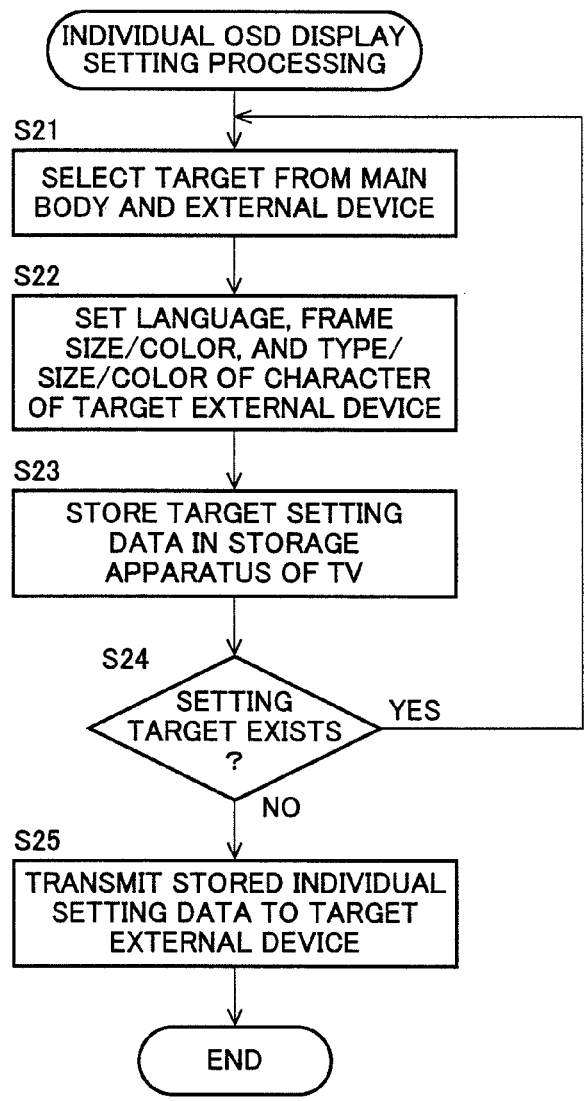
FIG. 5 is a flowchart subsequent to that of FIG. 4.

In the above, description has been given for each embodiment of the present invention, and an example of processing including various automatic OSD display setting processing in the TV 1 is described referring mainly to FIGS. 4 and 5. FIG. 4 is a flowchart illustrating an example of display setting on the OSD display setting screen and transfer processing thereof in FIG. 3, and FIG. 5 is a flowchart illustrating processing subsequent to that of FIG. 4.

In the OSD display setting processing, the system controller 20 firstly determines whether or not display setting is only for the TV 1 main body (step S1), and when display setting for the individual external AV devices 3 to 9 is performed, the procedure proceeds to step S2. Processing subsequent to step S2 will be described below referring to FIG. 5.

In the case of YES at step S1, the system controller 20 receives display setting of languages, size/color of frames, type/size/color of characters, figures and symbols from the TV remote controller 2 through the remote controller receiving portion 19 while displaying the OSD display setting item list 63 on the menu screen 60 as shown in FIG. 3 and the respective items in the list (step S3), and then stores the setting data (OSD display setting data 23a) in a storage area of the OSD processing portion 23, for example, in a built-in or exterior RAM or ROM (including nonvolatile one) (step S4). As the setting in OSD display (including in EPG display), for example, setting of an OSD font as a roman font, setting of a character size as large, and the like are performed.

Next, the system controller 20 displays the items in the setting item list 65 for "reflection on external devices" 64 to determine to which item the setting received by a user operation corresponds (steps S5, S6, S8 and S11), and executes the processing in accordance with the determination result. For example, first, whether to reflect on external AV devices is determined at step S5, and when no reflection is made, the processing is ended. When reflection is made, whether or not all setting is the same as that in the TV 1 is determined at step S6, and in the case of YES, the stored OSD display setting data 23a is sent to all of the external AV devices (step S7), and the processing is ended. The external AV devices 3 to 9 that received the OSD display setting data 23 are to perform setting display content as it is or setting display content changed based on setting in the devices.

In the case of NO at step S6, whether or not all of the external AV devices 3 to 9 have common different setting is determined (step S8), and in the case of YES, common OSD display setting data 23b for external AV devices is generated from the stored OSD display setting data 23a (step S9), and the generated OSD display setting data 23b is sent to all of the external AV devices 3 to 9 (step S10), and the processing is ended. In this case, the external AV devices 3 to 9 that received the OSD display setting data 23b are to perform setting display content as it is or setting display content changed based on setting in the devices.

In the case of NO at step S8, whether or not common different setting for each type is determined (step S11), and in the case of YES, the OSD display setting data 23b for each type for external AV devices is generated from the stored OSD display setting data 23a (step S12), and the generated OSD display setting data 23b for each type is sent to each of the corresponding external AV devices 3 to 9 (step S13), and the processing is ended.

As the setting in OSD display (including in EPG display), for example, setting of an OSD font as a roman font, setting of a character size as large, and the like are performed to be stored as the OSD display setting data 23a. On the other hand, as the OSD display setting data 23b for each type, data having such setting content for the recorder I (4) and the recorder II (9) that an OSD color is set as a tone color such as red specified in the TV 1 is generated/sent, and data having such setting content for the player I (6) and the player II (7) that an OSD color is set as a tone color such as green specified in the TV 1 is generated/sent. In this case, the external AV devices 3 to 9 that received the OSD display setting data 23b perform setting display content as it is (or setting display content changed) based on setting in the devices.

In the case of NO at step S11, since setting is different for each of the external AV devices 3 to 9 and different from that for the TV 1, the individual OSD display setting data 23b for the external AV devices is generated from the stored OSD display setting data 23a (step S14), and the generated individual OSD display setting data 23b is sent to each of the corresponding external AV devices 3 to 9 (step S15), and the processing is ended. In this case, the external AV devices 3 to 9 that received the OSD display setting data 23b perform setting display content as it is (or setting display content changed) based on setting in the devices.

At step S2, firstly, the system controller 20 selects a device of which display setting is to be changed out of the TV 1 main body and the external AV devices 3 to 9 (step S21) based on a user operation, receives a user operation for display setting of languages, size/color of frames, type/size/color of characters, figures and symbols with respect to the target device (step S22), and stores the setting data (the OSD display setting data 23a for the TV 1 or the OSD display setting data 23c for external devices) in a storage area of the OSD processing portion 23 (step S23). Subsequently, the system controller 20 determines whether or not a device targeted for setting still exists (step S24), and when exists, the steps S21 to S23 are repeated. Alternatively, when not exists, the system controller 20 sends the stored individual OSD display setting data 23c to each of the corresponding external AV devices 3 to 9 (step S25), and the processing is ended. In this case, the external AV devices 3 to 9 that received the OSD display setting data 23c perform setting display content as it is or setting display content changed based on setting in the devices.

In the above, description has been given for the processing of automatic OSD display setting as a main characteristic of the present invention, however, as another embodiment of the present invention, not only OSD display setting data but also content reproduction setting data may be sent to the external AV devices 3 to 9.

The TV 1 according to the present embodiment includes a reproduction setting means for receiving, for example, reproduction setting at the time of video/audio reproduction of setting in reproducing a DVD (subtitle, audio and the like). The reproduction setting means can be formed just by changing setting target in the similar manner as the display setting means. Furthermore, the TV 1 according to the present embodiment includes a reproduction setting data generation means for generating and storing reproduction setting data to be applied in video/audio reproduction from the reproduction setting received by the reproduction setting means. The reproduction setting data generation means can be formed just by changing setting target in the similar manner as the setting data generation means.

In addition, the setting data transmission means in the present embodiment is composed so as to send reproduction setting data for the TV 1 (command having the same the setting content as the setting content shown by this) stored by the reproduction setting data generation means to the external AV devices 3 to 9 through the connection means, together with or in addition to the OSD display setting data targeted for transmission. Here, the setting data transmission means may be composed so as to send the reproduction setting data as a CEC command in the similar manner as the OSD display setting data. The present embodiment enables to perform setting even other than the ODS display setting at a time. In addition, it is also possible that various reflection methods on the external AV devices 3 to 9, are also applicable to the reproduction setting data in the similar manner as the OSD display setting data.

Furthermore, in each of the above-mentioned embodiments, when any of the external AV devices 3 to 9 is connected by the connection means, display setting and reproduction setting in the external AV device can be also changed automatically.

At this time, the display setting is suddenly changed, which can not be noticed by a user and causes the user to be confused. In order to prevent this, as another embodiment of the present invention, TV 1 may be provided with a warning means which gives a warning that is noticing the change of display setting using OSD display or warning sound before transmission by the setting data transmission means is made to the connected external AV device, by detecting that any of the external AV devices 3 to 9 is connected to the TV 1 using a plug-and-play function.

Note that, in the HDMI standard, the plug-and-play function is realized to perform transmission of video signal in accordance with a resolution of a display panel to be used. In order to realize the plug-and-play function, a transmission path is also provided with a low speed bus. The low speed bus is called a DDC (Display Data Channel) and an I2C bus which is a bidirectional bus or the like is employed. Through the low speed bus, receiving-side information (EDID: Extended Display Identification Data) is acquired by the transmission-side to realize the plug-and-play function. The EDID includes information concerning the types of signal that can be processed by a display device, information of a resolution of a display panel, information of a pixel clock, a horizontal effective period, a vertical effective period and the like.

Furthermore, there is a case where a user is in trouble when display setting is suddenly changed. In order to prevent this, as an alternative embodiment of the above-mentioned warning means, TV 1 may be provided with a confirmation means that inquires (confirms) whether display setting can be changed using OSD display or sounds before transmission by the setting data transmission means is made to the connected external AV device by detecting the fact that any one of the external AV devices 3 to 9 is connected to the TV 1 using a plug-and-play function. In addition, the setting data transmission means may be composed so as not to execute transmission by the setting data transmission means when changing of the display setting is not allowed by the confirmation means. When applying to a mode to generate the data 23b and 23c for external devices, it may be provided so as not to execute not only transmission but also generation, or to return after generation.

The invention claimed is:

1. An AV device including a connection portion for connecting external AV devices capable of performing OSD display and an OSD display portion for performing OSD display on an external display device or an internal display device, comprising:

a display setting portion for receiving display setting in the OSD display portion;

a setting data generation portion for generating and storing OSD display setting data to be applied at the OSD display portion from display setting received by the display setting portion;

a setting data transmission portion for sending the OSD display setting data for the AV device stored by the setting data generation portion to the external AV devices through the connection portion; and an external setting data generation portion for generating, from the OSD display setting data for the AV device stored by the setting data generation portion, OSD display setting data for the external AV devices that has different display setting content from the OSD display setting data, wherein the setting data transmission portion sends OSD display setting data generated by the external setting data generation portion to the external AV devices, instead of the OSD display setting data for the AV device.

2. The AV device as defined in claim 1, wherein when the OSD display setting data to be transmitted is updated, the setting data transmission portion executes transmission of the updated OSD display setting data.

3. The AV device as defined in claim 1, wherein the external setting data generation portion generates, from the OSD display setting data for the AV device stored by the setting data generation portion, OSD display setting data for the external AV devices for each type that has different display setting content from the OSD display setting data and has common display setting content for each type of the external AV devices, and the setting data transmission portion sends the OSD display setting data for each type generated by the external setting data generation portion to each of the corresponding type of the external AV devices, instead of the OSD display setting data for the AV device.

4. The AV device as defined in claim 1, wherein
the external setting data generation portion generates, from the OSD display setting data for the AV device stored by the setting data generation portion, OSD display setting data for the external AV devices for each of the external AV devices that has different display setting content from the OSD display setting data, and
the setting data transmission portion sends the OSD display setting data for each of the external AV devices generated by the external setting data generation means to each of the corresponding external AV devices, instead of the OSD display setting data for the AV device.

5. The AV device as defined in any one of claims 1, 3, and 4, wherein
when the OSD display setting data for the AV device stored by the external setting data generation portion is updated, the external setting data generation portion executes generation of the OSD display setting data for the external AV devices from the updated OSD display setting data for the AV device, and the setting data transmission portion executes transmission of OSD display setting data to be transmitted.

6. The AV device as defined in any one of claims 1 and 2, comprising:
a setting data receiving portion for receiving the OSD display setting data for the AV device from the external AV devices through the connection portion; and
a setting data storage means for storing the OSD display setting data received by the setting data receiving portion to be applied at the OSD display portion.

7. The AV device as defined in claim 1 or 2, comprising:
a setting data receiving portion for receiving the OSD display setting data for the AV device from the external AV devices through the connection portion;
a setting data regeneration portion for regenerating the OSD display setting data that has different display setting content from the OSD display setting data from the OSD display setting data received by the setting data receiving portion; and
a setting data storage portion for storing the OSD display setting data regenerated by the setting data regeneration portion to be applied at the OSD display portion.

8. The AV device as defined in any one of claims 1 and 2, wherein
the display setting includes a part or all of setting among setting of a color, setting of a type and setting of a size with respect to characters, graphics and symbols in OSD display.

9. The AV device as defined in any one of claims 1 and 2, wherein
the display setting is a part or all of setting of characters, graphics, symbols, frames and languages in OSD display.

10. The AV device as defined in any one of claims 1 and 2, wherein
the connection portion is portion for performing connection in accordance with the HDMI standard, and the setting data transmission portion is portion for sending OSD display setting data as a CEC command.

11. The AV device as defined in any of claims 1 and 2, comprising:
a reproduction setting portion for receiving reproduction setting at the time of video/audio reproduction; and
a reproduction setting data generation portion for generating and storing reproduction setting data to be applied at the time of video/audio reproduction from the reproduction setting received by the reproduction setting portion, wherein
the setting data transmission portion sends reproduction setting data for the AV device stored by the reproduction setting data generation portion to the external AV devices together with OSD display setting data to be transmitted through the connection portion.

12. The AV device as defined in claim 11, wherein
the connection portion is portion for performing connection in accordance with the HDMI standard, and the setting data transmission portion is portion for sending the OSD display setting data and reproduction setting data as a CEC command.

13. The AV device as defined in any one of claims 1 and 2, wherein
the AV device is a television receiver including the internal display device, and
the external AV devices are any of a reproducing device for reproducing video/audio, a recording device for recording video/audio, a recording and reproducing device for recording and reproducing video/audio, an AV amplifier, and a set top box.

14. The AV device as defined in any one of claims 1 and 2, comprising a warning portion for warning that display setting changes before transmission by the setting data transmission portion to the connected external AV devices is performed when the external AV devices are connected by the connection portion.

15. The AV device as defined in any one of claims 1 and 2, comprising a confirmation portion for confirming whether to change display setting, before transmission by the setting data transmission portion to the connected external AV devices is performed when the external AV devices are connected by the connection portion, wherein
the setting data transmission portion does not execute transmission by the setting data transmission portion when the confirmation portion does not allow change of display setting.

16. The AV device as defined in any one of claims 1 and 2, wherein
the connection portion is portion for performing connection in accordance with the HDMI standard, and the AV device includes portion for obtaining, using a CEC command, a part or all of a device name, a logical address, a physical address, an input/output terminal name, a state, and setting information in the external AV devices.

* * * * *